(No Model.) 2 Sheets—Sheet 1.
T. H. WEBB.
INSECT DESTROYER.
No. 377,127. Patented Jan. 31, 1888.
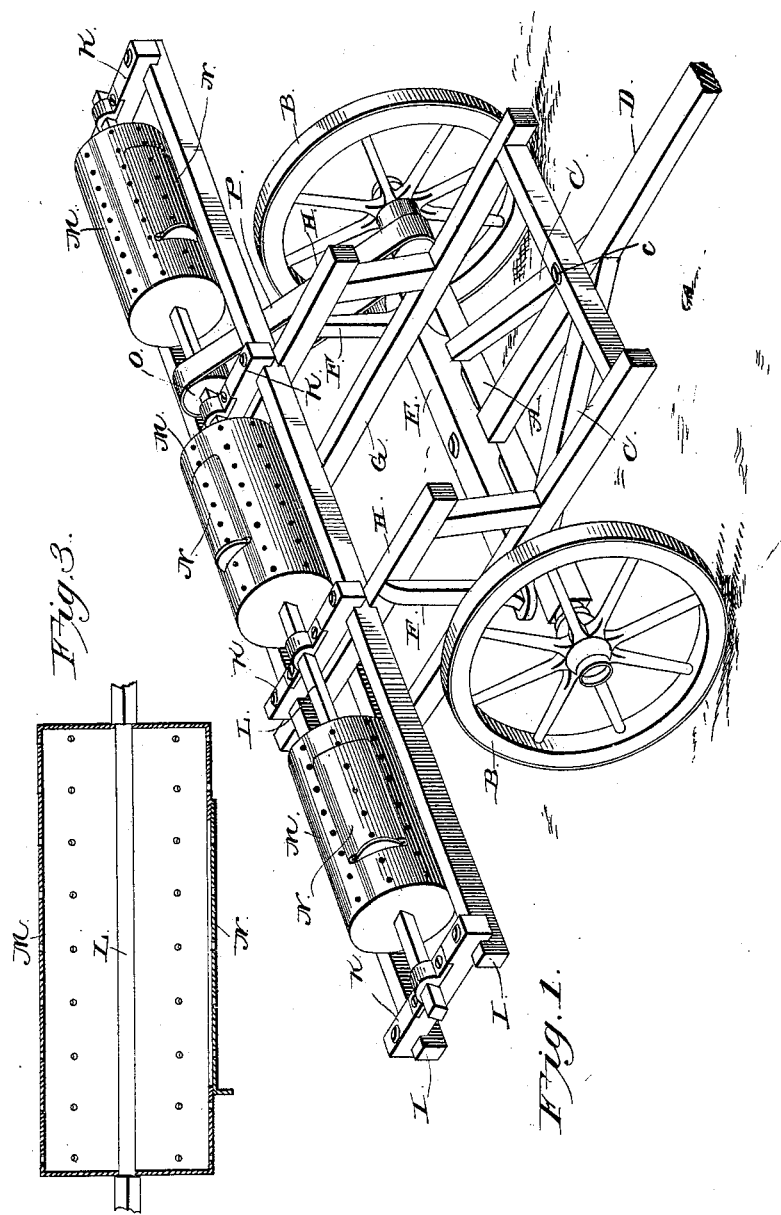

(No Model.) 2 Sheets—Sheet 2.
T. H. WEBB.
INSECT DESTROYER.
No. 377,127. Patented Jan. 31, 1888.
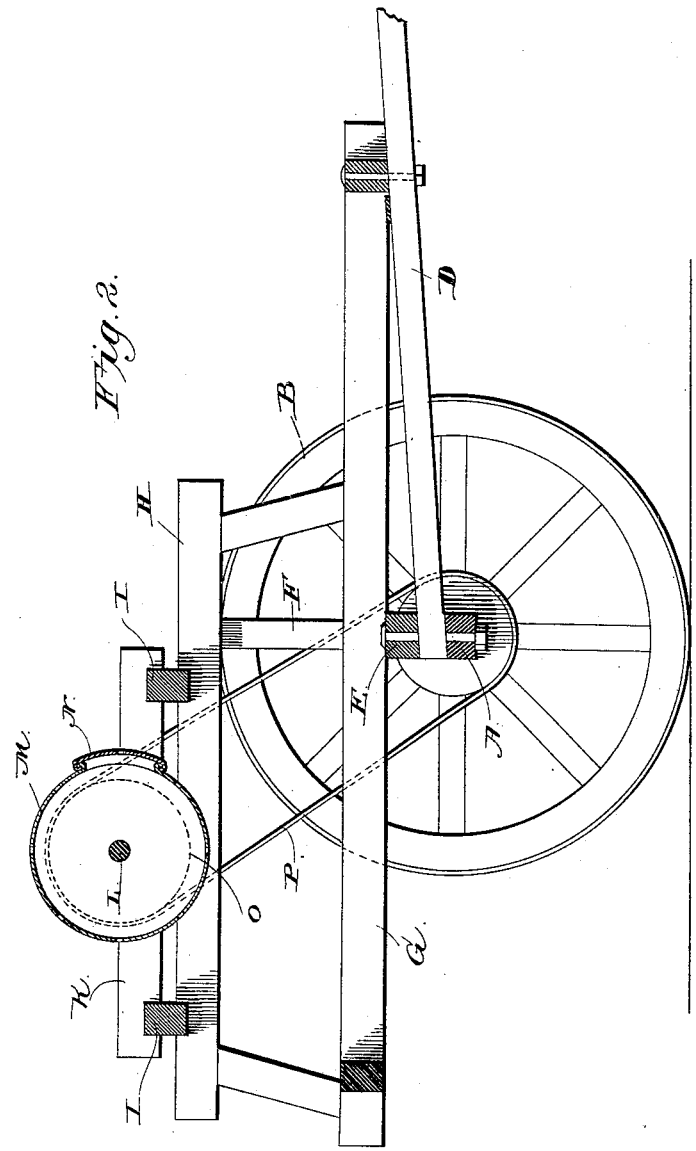
Witnesses
M. Fowler
E. L. Biggett
Inventor
Thomas H. Webb
By his Attorneys
C. A. Knowles

UNITED STATES PATENT OFFICE.

THOMAS H. WEBB, OF BAY VIEW, TEXAS.

INSECT-DESTROYER.

SPECIFICATION forming part of Letters Patent No. 377,127, dated January 31, 1888.

Application filed November 16, 1887. Serial No. 255,334. (No model.)

*To all whom it may concern:*

Be it known that I, THOMAS H. WEBB, a citizen of the United States, residing at Bay View, in the county of Harris and State of Texas, have invented a new and useful Improvement in Sprinklers, of which the following is a specification.

My invention relates to an improvement in machines for destroying the bugs and worms that infest cotton and other plants; and it consists in the peculiar construction and combination of devices, that will be more fully set forth hereinafter, and particularly pointed out in the claim.

In the accompanying drawings, Figure 1 is a perspective view of a machine embodying my improvements. Fig. 2 is a vertical longitudinal section of the same. Fig. 3 is a detail sectional view of one of the sifters.

A represents the axle, on the ends of which are journaled a pair of wheels, B.

C represents a pair of hounds which are attached to the axle, and D represents a tongue which is secured to the outer end of the hounds and has its rear end secured rigidly to the axle, as shown. On the upper side of the axle is bolted a bolster, E, from the ends of which project a pair of vertical standards, F.

G represents a rectangular horizontal frame, which is arranged on the bolster and has its front ends bolted at $c$ to the tongue, as shown. On opposite sides of the frame, near the rear end thereof, are benches H.

I represents a pair of parallel bars of suitable length, which are arranged transversely on the benches and project beyond the sides of the frame. These parallel bars are connected at their ends and at points directly over the benches by the cross-bars K, which are bolted to the bars I, and the inner ones of which are also bolted to the benches, as shown.

L represents a shaft which has its bearings in the bars K and is provided with three cylindrical sifters, M, one of which is arranged over the frame and the others are supported beyond the sides of the frame. The said sifters may be made of perforated sheet metal, as here shown, or of wire-gauze or a suitable fabric, and are each provided with a slide-door, N, by means of which the cylinders may be filled.

O represents a pulley which is attached to the shaft L, is arranged in line with the inner end of the hub of one of the wheels B, and is connected thereto by an endless belt, P.

The operation of my invention is as follows: Paris-green, London purple, or other suitable poisonous powders are mixed with plaster in suitable proportions and are placed in the cylinders. The machine is driven across the field astride of one of the rows of plants, so that the central cylindrical sifter will be arranged directly over the said row of plants and the outer sifters will be arranged over the adjacent rows of plants. As the machine advances, the rotation of the driving-wheel B is imparted to the shaft L through the pulley and the endless belt previously described, and the sifters are caused to rotate with the shaft L and to sift the poisonous compound over the plants in a dry state, and thus effectually destroy the insect pests.

It will be observed that the machine applies the poison to three rows of plants at once, is very expeditious in operation, and enables a large field to be treated in a very short space of time. The services of only one person are needed to operate the machine.

Heretofore, as far as I am aware, it has been the practice to mix the poison with water and apply it to the plants in a liquid state by means of suitable pumps and sprinkling devices; but it has been found that poison applied in a dry state is very much more effective.

By drawing out the bolt $c$ the frame G can be immediately detached from the truck formed by the axle, hounds, and tongue, as it will lift out from between the standards F, and the frame formed by the bars I and K can be lifted from the frame G very readily for any necessary purpose.

I am aware that rotating cylindrical sifters mounted on an axle and connected with a wheeled frame are not new in the art, and such I do not claim, broadly.

Having thus described my invention, I claim—

The combination, with the truck formed by the axle, hounds, and tongue and provided with the standards F, of the frame G, fitting between said standards, the bolt $c$, the frame composed of the bars I and K, removably attached to the frame G, the shaft L, journaled in bearings secured to the bars K, the pulleys on said shaft and on the axle, the band connecting said pulleys, and the cylindrical sifters secured on the shaft L at proper points and provided with the described perforations and doors N, substantially as specified.

In testimony that I claim the foregoing as my own I have hereto affixed my signature in presence of two witnesses.

THOMAS H. WEBB.

Witnesses:
ROBERT THOMPSON,
H. C. MILLER.